United States Patent
Miyawaki et al.

(10) Patent No.: US 6,554,035 B1
(45) Date of Patent: *Apr. 29, 2003

(54) HEAVY DUTY PNEUMATIC TIRE WITH HIGH ELONGATION STEEL BELT CORD

(75) Inventors: Rie Miyawaki, Akashi (JP); Masatsugu Kohno, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/441,369

(22) Filed: Nov. 17, 1999

Related U.S. Application Data

(60) Division of application No. 08/725,983, filed on Oct. 4, 1996, now Pat. No. 6,065,518, which is a continuation-in-part of application No. 08/509,893, filed on Aug. 1, 1995, now Pat. No. 5,688,597.

(30) Foreign Application Priority Data

| Oct. 6, 1995 | (JP) | ............................................. 7-260200 |
| Oct. 30, 1995 | (JP) | ............................................. 7-281878 |

(51) Int. Cl.$^7$ .............................. B60C 9/00; D07B 1/06; D07B 1/08; D07B 1/10
(52) U.S. Cl. ........................... 152/451; 57/206; 57/207; 57/212; 57/902
(58) Field of Search ................................. 152/451, 527, 152/531, 533, 534, 454; 57/206, 207, 212, 311, 902

(56) References Cited

U.S. PATENT DOCUMENTS

| 4,420,025 A | 12/1983 | Ghilardi et al. | ......... 152/531 X |
| 5,287,691 A | 2/1994 | Okamoto et al. | ....... 152/451 X |
| 5,351,470 A | 10/1994 | Shinmura | |
| 5,688,597 A | 11/1997 | Kohno | ................... 152/527 X |

FOREIGN PATENT DOCUMENTS

| DE | 19526721 A1 | 2/1996 | ................. 152/451 |

*Primary Examiner*—Adrienne C. Johnstone
(74) *Attorney, Agent, or Firm*—Birch, Stewart, Kolasch & Birch, LLP

(57) ABSTRACT

A heavy duty pneumatic tire has a belt disposed radially outside a carcass and radially inside a tread portion, the belt having at least one ply of at least one high-elongation steel cord, the high elongation steel cord is formed by twisting at least three waving steel filaments together to form a core and a sheath surrounding the core, the waving filaments change place repeatedly along the longitudinal direction of the cord such that one of the filaments forms the core in a portion, but in a different portion of the cord, the same filament forms part of the sheath, thereby defining a plurality of first parts with the core and a plurality of second parts without the core which are disposed alternately in the longitudinal direction of the cord, and the elongation at break of the high-elongation steel cord is in the range of from 4 to 10%, whereby the resistance to breakage of the steel belt cords is improved and it becomes possible to decrease the belt weight without deteriorating various performances.

1 Claim, 13 Drawing Sheets

COMPARATIVE ART

US 6,554,035 B1

HEAVY DUTY PNEUMATIC TIRE WITH HIGH ELONGATION STEEL BELT CORD

This application is a divisional of application Ser. No. 08/725,983, filed on Oct. 4, 1996, now U.S. Pat. No. 6,065,518 which is a CIP of Ser. No. 08/509,893 filed Aug. 1, 1995, now U.S. Pat. No. 5,688,597 the entire contents of which are hereby incorporated by reference.

BACKGROUND OF THE INVENTION

The present invention relates to a heavy duty pneumatic tire having an improved belt structure.

The heavy duty pneumatic tires for heavy vehicles such as trucks, buses and the like are usually provided in the tread portion with a stiff belt, which belt includes a plurality of steel cord breaker plies. The breaker plies are made of conventional steel cords which are well known in the art such as: Regular cord (a cord in which the direction of lay in the strands is opposite to the direction of lay in closing the cord); Lang's lay cord (a cord in which the direction of lay in the strands is the same as the direction of lay in closing the cord); and Compact cord (CC) (a wrapped cord in which the filaments mainly have linear contact with each other).

Recently, a steel cord in which some (a small number) of the filaments are replaced by waving filament(s) has been proposed, example, in U.S. Pat. No. 5,351,470. This replacement of unwaving filaments with waving filaments aims to improve the penetration of rubber into the cord.

Such steel cord is certainly improved in the penetration of rubber. However, due to the difference between the length of the unwaving filaments and the length of the waving filaments, a tension imbalance occurs and the cord is liable to be broken under the extreme conditions that a heavy duty pneumatic tires is often exposed.

SUMMARY OF THE INVENTION

It is a primary object of the present invention to provide a heavy duty pneumatic tire having an improved belt in which, by improving the resistance to breakage of the steel cords used in the belt, the belt weight can be decreased causing a deteriorating in the performances.

According to one aspect of the present invention, a heavy duty pneumatic tire comprises
 a tread portion,
 a pair of axially spaced bead portions,
 a pair of sidewall portions extending between the tread edges and the bead portions,
 a toroidal carcass extending between the bead portions, and
 a belt disposed radially outside the carcass and radially inside the tread portion, the belt comprising at least one ply of at least one high-elongation steel cord.

Each of the at least one high-elongation steel cords is formed by twisting at least three waving steel filaments together to form a core and a sheath surrounding the core.

The least three waving filaments change place repeatedly along the longitudinal direction of the cord such that one of the filaments forms the core at a portion thereof. In a different portion of the cord, the same filament forms a part of the sheath, thereby defining a plurality of first parts with the core, and a plurality of second parts without the core which are disposed alternately in the longitudinal direction of the cord. The elongation at break of each of said at least one high-elongation steel cord is in the range of from 4 to 10%.

According to another aspect of the present invention, a tire comprises a reinforcing layer made of at least one high-elongation steel cord.

Each of the at least one high-elongation steel cord is formed by twisting at least three steel filaments together to form a core and a sheath surrounding the core.

The at least three filaments change place repeatedly along the longitudinal direction of the cord such that one of the filaments forms the core at a portion thereof. In a different portion of the cord, the same filament forms a part of the sheath, thereby defining a plurality of first parts with the core and plurality of second parts without the core, which are disposed alternately in the longitudinal direction of the cord.

BRIEF DESCRIPTION OF THE DRAWINGS

Other features and advantages of the present invention will be apparent from the present following description taken in connection with the accompanying drawings wherein:

FIGS. 13A, 13B, 13, 13D and 13E are schematic cross sectional views thereof.

DETAILED DESCRIPTION OF THE INVENTION

Figure 1:
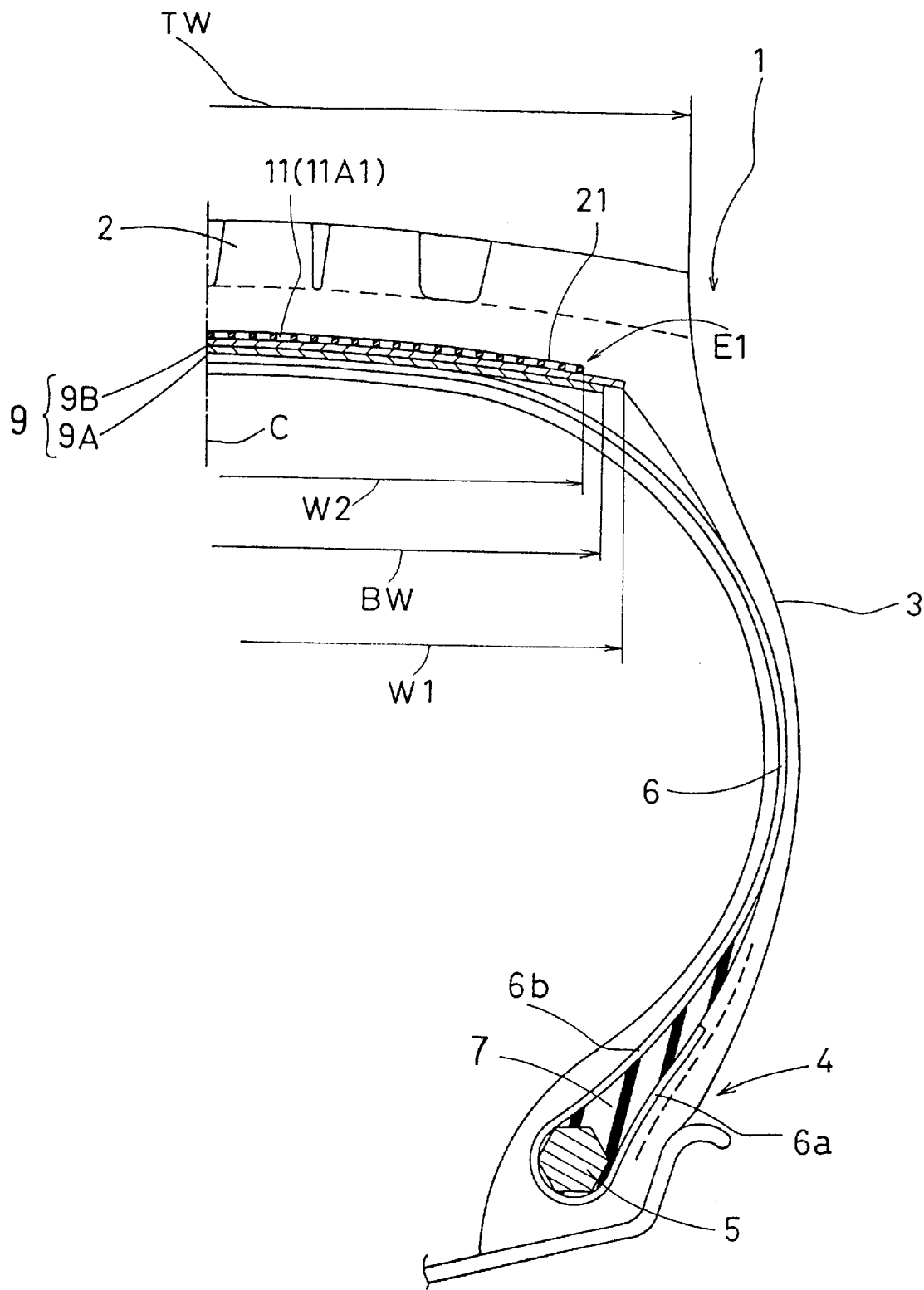
FIG. 1 is a cross sectional view of an embodiment of the present invention.

In the drawings, the heavy duty pneumatic tire 1 according to the present invention comprises
 a tread portion 2,
 a pair of axially spaced bead portions 4 with a bead core 5,
 a pair of sidewall portions 3 extending between the tread edges and the bead portions 4,
 a toroidal carcass 6 extending between the bead portions 4,
 a belt (breaker 9, band 11) disposed radially outside the carcass 6 and inside the tread, and the belt including a steel ply made of steel cords 21,
 wherein
  each of the steel cords 21 consisting of waving steel filaments 22 twisted together so as to form a core 23 and a sheath 24 surrounding the core, all the waving steel filaments 22 changing places repeatedly along the longitudinal direction of the cord such that one of the filaments forms the core 23 in one portion of the cord, but in a different portion of the cord forms a part of the sheath 24.

FIG. 1 shows a first embodiment of the present invention.

In this embodiment, a band 11 composed of steel cords 21 of a novel structure is provided radially outside of a breaker 9.

Being used at high internal pressure and high load, a conventional pneumatic tire for a heavy load is usually formed of three or four plies of breakers composed of steel cords of low elongation (elongation at breaking of 2 to 4%).

In such pneumatic tires, at the time of vulcanization, the breaker may be stretched about 2.5 to 4.0% in the circumferential direction, and therefore the breaker cords are laid at an angle of more than 10 degrees to the tire equator.

Due to such cord angle, however, belt looseness or ply separation may be induced by repeated deformation during running and the centrifugal force created in high speed running, and hence high speed durability is lowered.

To solve such problems, an organic fiber cord stretching largely during vulcanization is spirally wound to form a band, which is disposed outside of the breaker in the radial direction of tire, and the breaker is tightened by the band. However, if the cut resistance that is required in a tire for heavy load is demanded in this band, increase in the number of plies is inevitable, and the tire weight is increased, and the fuel economy is lowered. Also since the conventional steel cord is low in stretchability, such a band thus formed hard to vulcanize and process.

In this embodiment, therefore, by disposing a band composed of steel cords, of novel structure, outside of the breaker in the radial direction, loosening and moving of the breaker can be suppressed, and high speed durability and uniformity can be improved. Also the breaker is securely protected from injury and the number of breaker plies is curtailed without lowering the hoop effect.

In the tire shown in in FIG. 1, a carcass 6 is composed of at least one carcass ply, in this example only one carcass ply, extending between a pair of bead portions 4 through a tread portion 2 sidewall portions 3. and both ends of the carcass fly are turned up a bead core 5 in the bead portion 4.

The carcass ply has cords laid at an angle of 75 to 90 degrees to the tire equator C.

As the carcass cords, in this embodiment, conventional steel cords are used, but, for example, nylon, rayon, polyester, and other organic fiber cords may be also used.

Still further, to reinforce and improve the tire transverse rigidity from the bead portion 4 to the sidewall portion 3, a bead apex rubber 7 made of a tapered rigid rubber is filled between each turnup portion 6a and the main portion 6b of the carcass 6.

Figure 2:
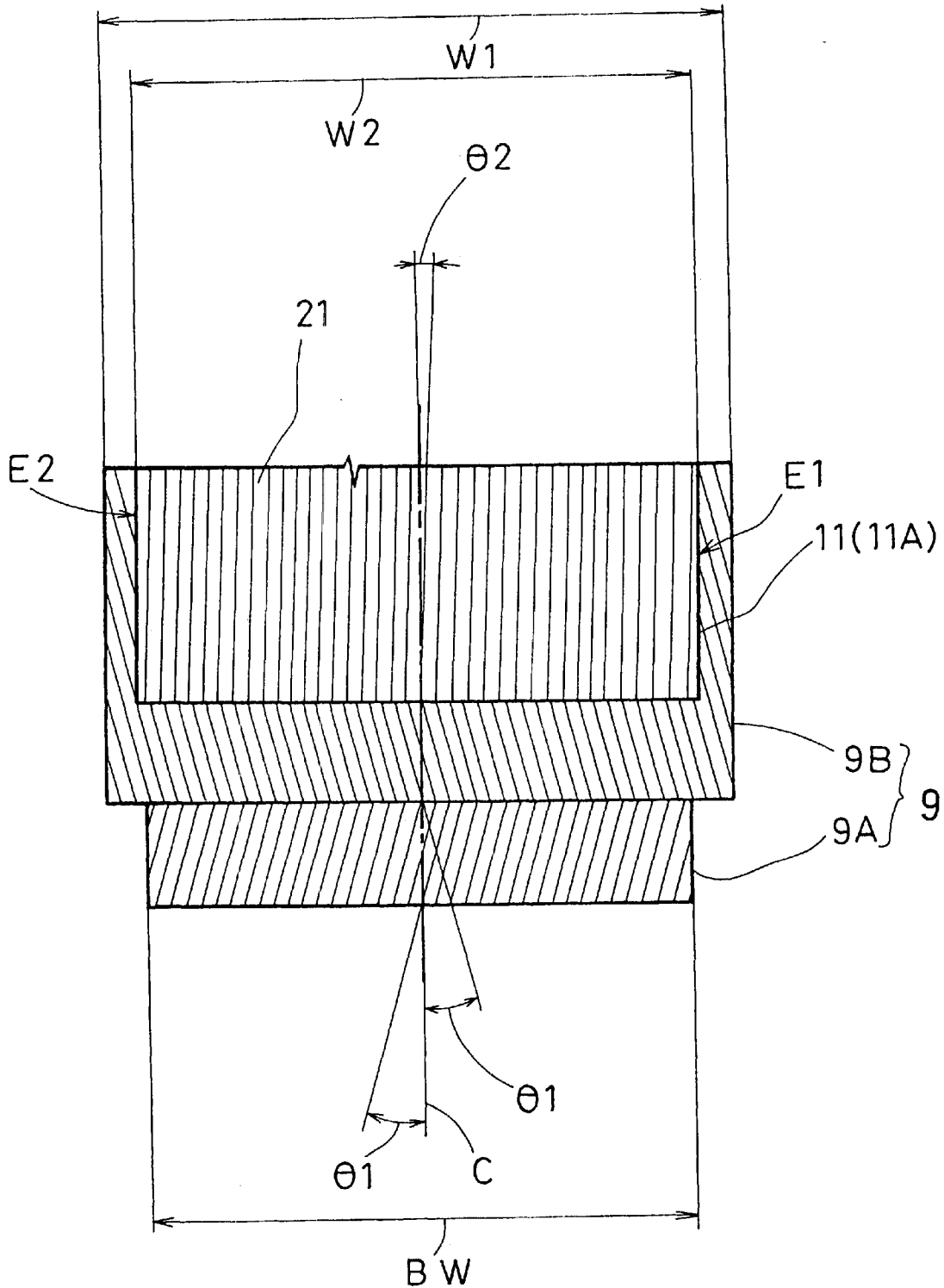
FIG. 2 is a schematic plan view showing the breaker belt and band belt thereof.

As shown in FIG. 2, the breaker 9 comprises at least two plies 9A, 9B made of parallel cords laid at an angle $\theta1$ of 10 to 20 degrees to the tire equator. The breaker plies 9A, 9B are overlaid on each other, adjacently, in the radial direction of the tire, and the breaker cords in each ply intersect those of the next ply.

The breaker 9 in this embodiment comprises two plies 9A, 9B, but it is also possible to utilize three plies or four plies by adding one or two breaker plies inside of the breaker plies 9A, 9B in the radial direction of tire. The cord angle of the additional breaker plies may be different from the angle $\theta1$.

Figure 7:
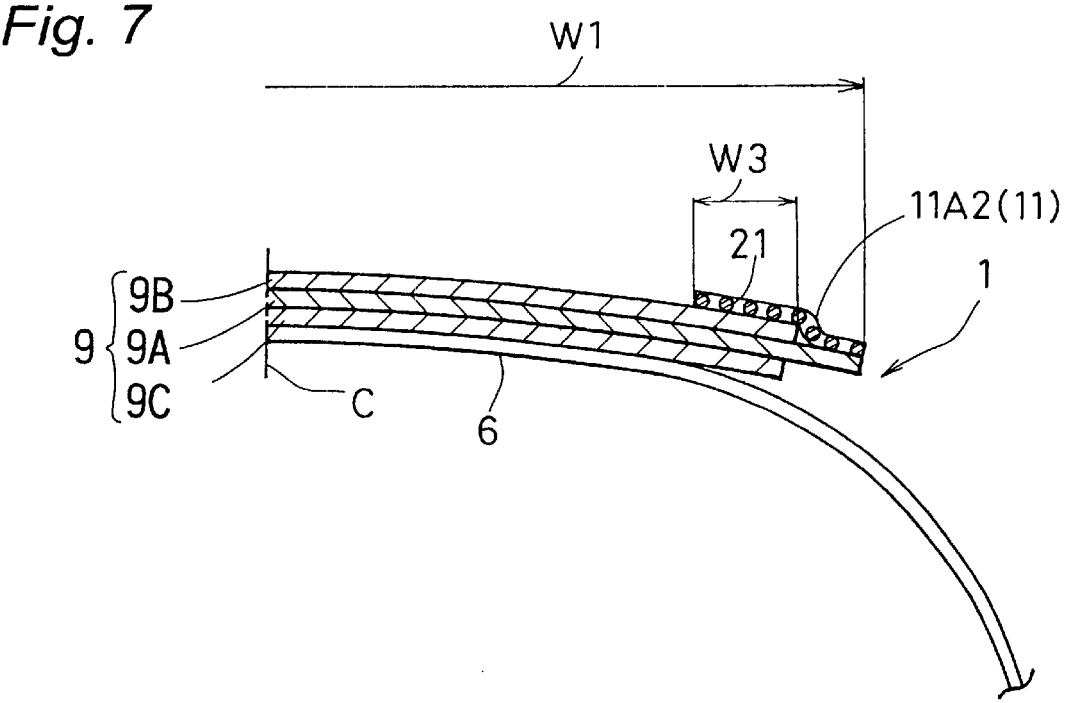
FIGS. 7 and 8 are schematic cross sectional views each showing a modification of the band.

For example, as shown in FIG. 7, when the breaker 9 is composed of three plies by adding a ply 9C adjacently to the carcass 6 and inside of the plies 9A, 9B, the cord angle of the ply 9C may be 60 to 75 degrees, preferably about 67 degrees. As a result, the ply 9C forms a truss structure together with the plies 9A, 9B, so that the rigidity difference from carcass 6 may be lessened.

The overlaying width of the breaker plies 9A and 9B, that is, the effective width BW of the breaker 9 is 0.75 to 0.90 times the width TW of the tread portion 2, and almost the entire width of the tread portion 2 is reinforced by its hoop effect.

To disperse the stress concentrated on the breaker edges, the second breaker from the carcass 6 side, that is, the outside breaker ply 9B in the two-layer composition of this example, or the middle breaker ply 9A in the three-layer composition is designed as the widest ply.

For the cords of the breaker plies 9A, 9B, 9C, low-elongation steel cords with an elongation at break of 2 to 4% are used, and more specifically the following conventional steel cords are used. For example, an n×m structure in which m strands of n twisted filaments are twisted together, and an n+m structure in which a sheath made of m filaments surrounds a core made of n filaments.

In other words, the above-mentioned regular cord and Lang's lay cord are used.

The band 11 is composed of one ply 11A of a band cord 21 spirally wound at angle $\theta2$ of 0 to 5 degrees, preferably 0 to 3 degrees, to the tire equator C. This band ply 11A is, in this example, formed as a full band ply 11A having a width W2 of more than 80% of the width W1 of the adjacent outside breaker ply 9B, for example, about 89%, and is laid in the middle of the breaker 9. The full band ply may be also formed by winding spirally at least one band cord 21 from one edge E1 to other edge W2 continuously, or formed by spirally winding from the middle to each edges E1, E2.

Figure 3:
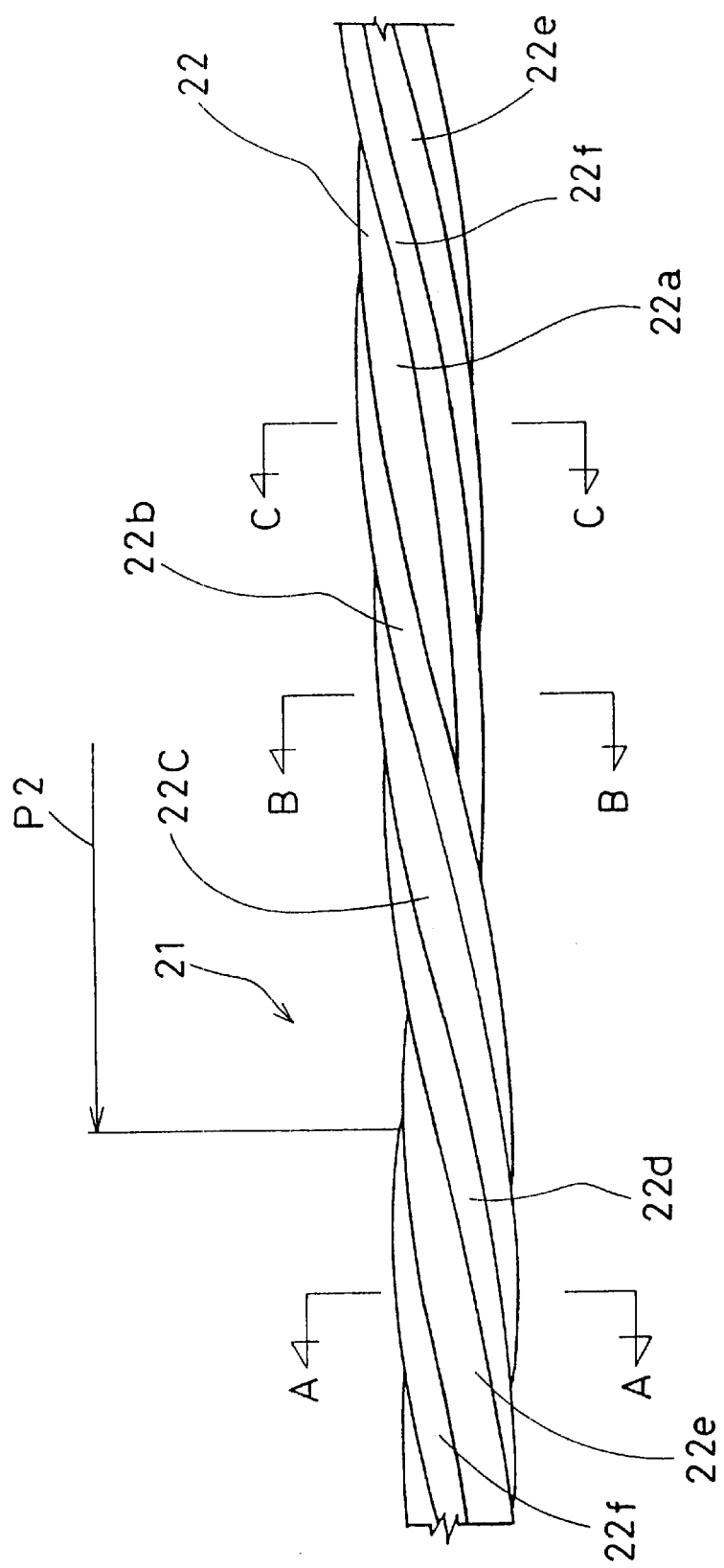
FIG. 3 is a side view of a cord used in the band belt.
Figure 4:
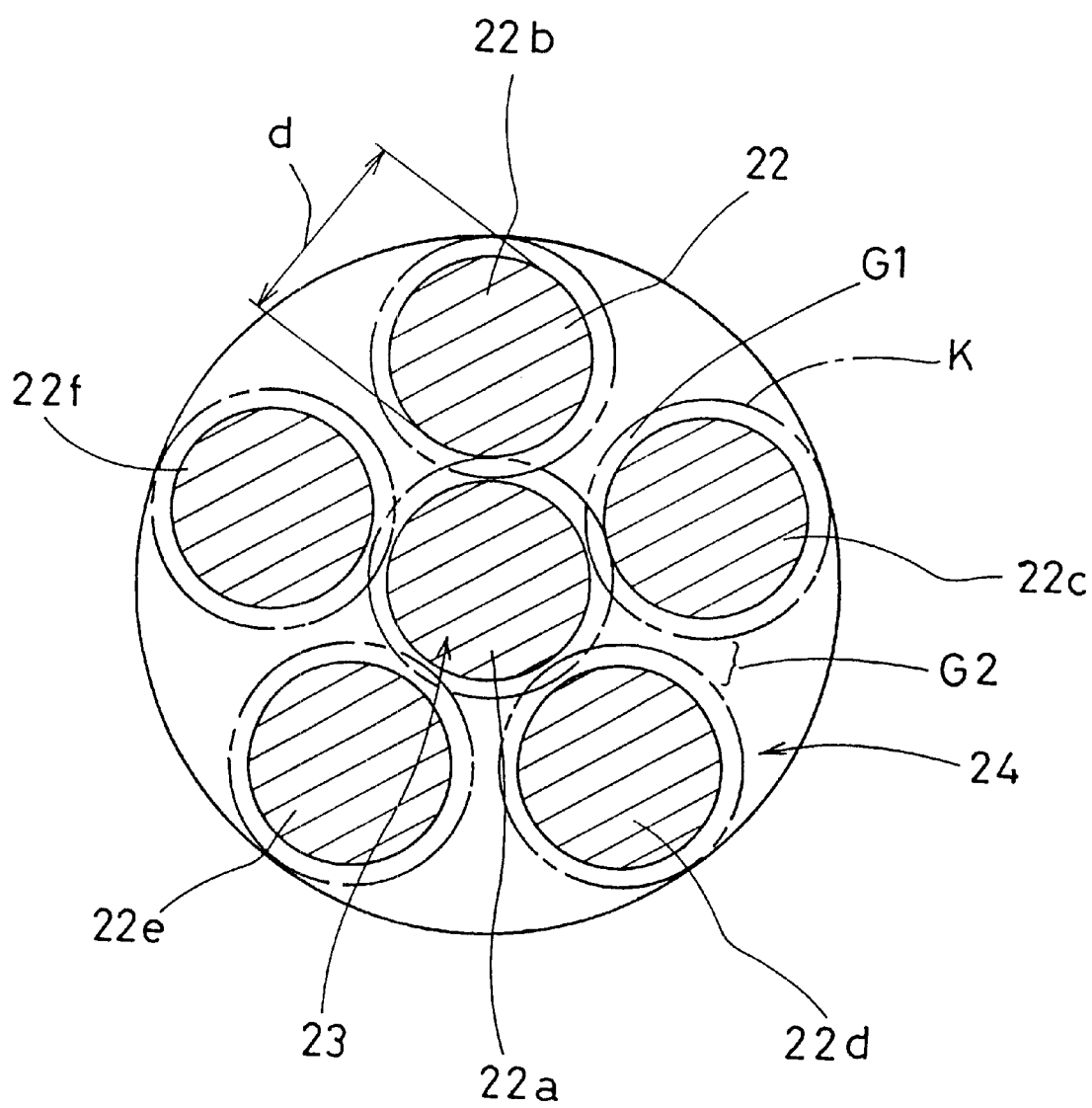
FIG. 4 is a cross sectional view taken along the line A—A of FIG. 3.
Figure 5:
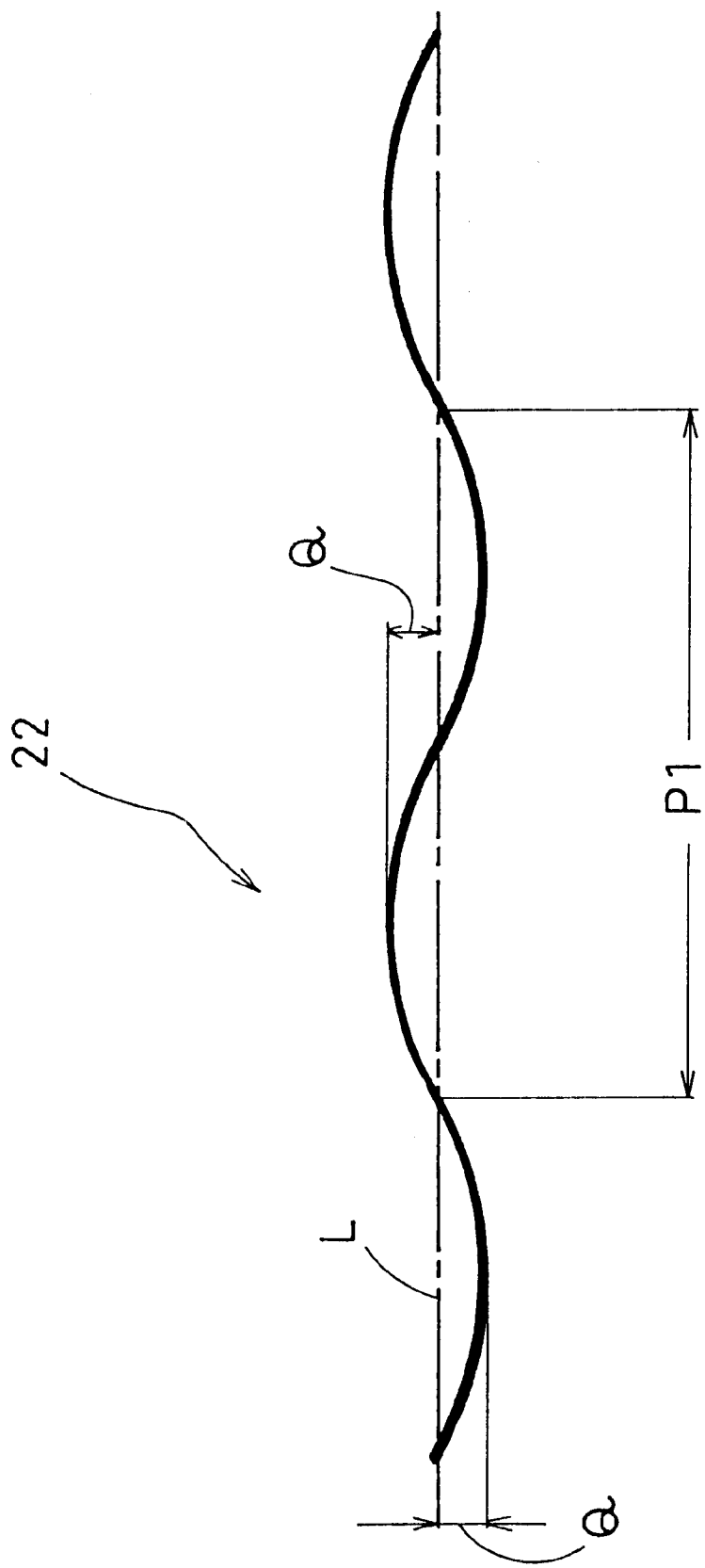
FIG. 5 is a diagram explaining a waving steel filament.
Figure 6:
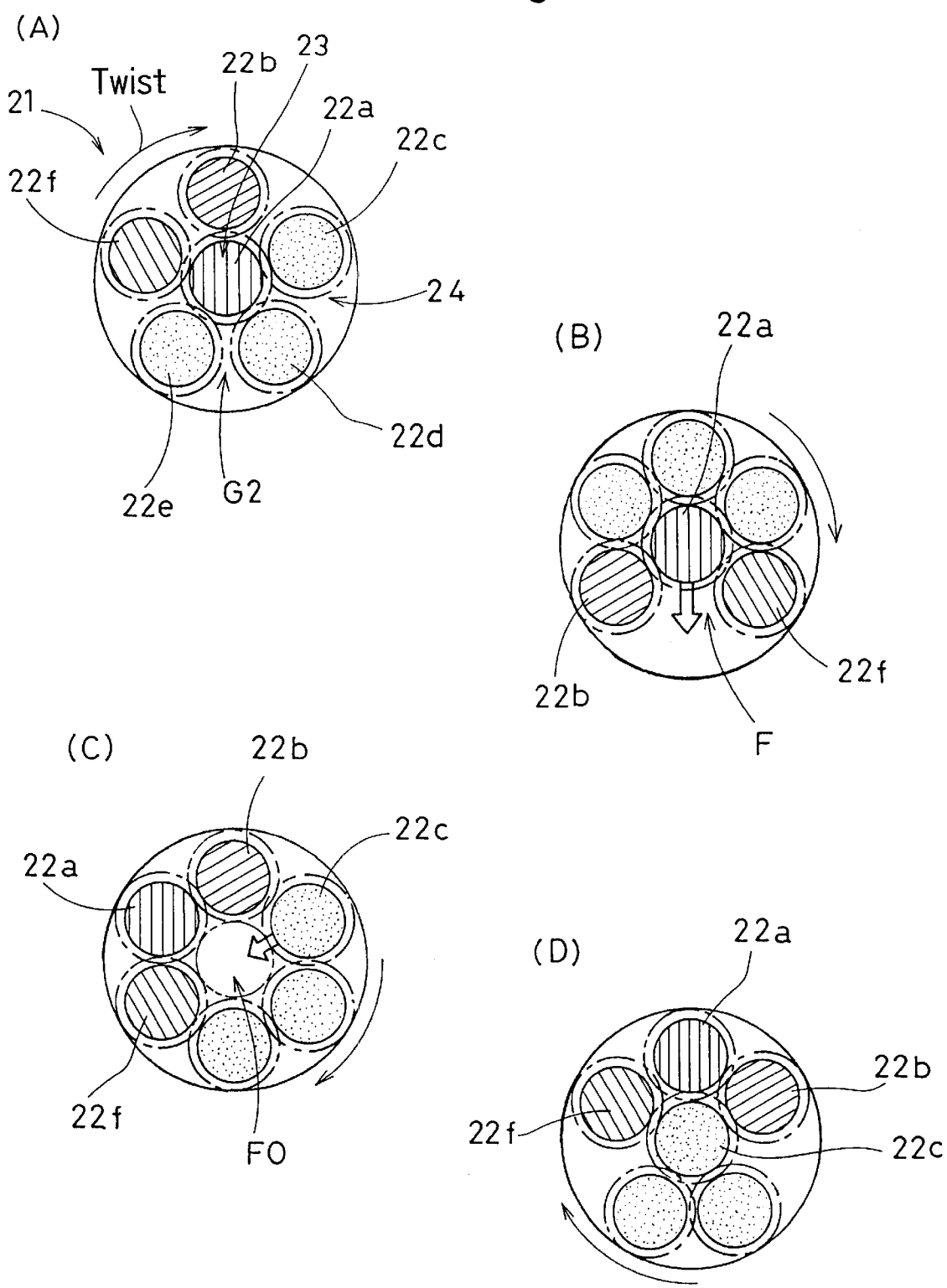
FIGS. 6A, 6B, 6C and 6D are schematic cross sectional views of a cord for explaining that their waving steel filaments change places along the longitudinal direction of the cord.

As shown in FIG. 3 and FIG. 4, the band cord 21 is formed of N steel filaments 22, specifically three to seven, a core 23 defined by one of the steel filaments 22 is surrounded by the remaining (N–1) steel filaments 22 defining a one-layer sheath 24, and the filaments are twisted together such that the steel filament 22 forming the core 23 and one of the steel filaments 22 forming the sheath 24 exchange their positions in a predetermined order along the length of the cord.

The steel filaments 22 are formed by, for example, drawing a steel rod, and the diameter (d) thereof is in a range of 0.20 to 0.40 mm.

The steel filament 22 is a waving filament corrugated before twisting, and the waving pitch P1 is set at 7 to 25 mm, and the deflection width or wave amplitude Q from the waving center L is set at 0.25 to 1.25 mm. From the viewpoint of uniformity and ease of handling, the pitch P1 and deflection width Q of each steel filament 22 are desired to be mutually identical. However, different filaments may be twisted together.

The twisted adjacent steel filaments 22, 22 repeat contact and non-contact by waving, so that a stable gap G1 is formed between the adjacent steel filaments 22, 22.

In FIG. 4 and FIG. 6(A) to (D), the arc of single dot chain line drawn to enclose each steel filament 22 is an existing region K of the steel filament 22 displaced by waving. Thus, the steel filament 22 is present in a non-specific direction in each region K, and adjacent steel filaments 22 repeat in contact and non-contact relationship In this example, as shown in FIG. 4, the band cord 21 is a Z-twisted cord comprising six (N=6) steel filaments 22.

At section A—A (FIG. 3) at a certain position of cord, as shown in FIG. 6(A), five steel filaments $22b, 22c, 22d, 22e, 22f$ are disposed around one steel filament $22a$ as the core 23 at a mutual gap G2, thereby forming a sheath 24. This gap G2 is a relatively free variable gap not determined by waving of the steel filaments 22.

At section B—B in a different position of cord, as shown in FIG. 6(B), the five filaments 22b, 22f for forming the sheath 24 approach to each other in the direction where the gap G2 is 0, and in this example, a space F corresponding nearly to one filament is formed between the filaments 22b and 22f.

At section C—C in a further different position of the cord, as shown in FIG. 6(C), the filament 22a forming the core 23 is moved to the sheath side, and a vacant place F0 is formed in the center of the cord, and an absent portion of the core 23 is formed.

Afterwards, at a further downstream side of twisting (right of line C—C in FIG. 3), as indicated by double dot chain line in FIG. 6(C), for example, the filament 22c is moved to the central vacant place F0, and the cord state returns to the cord centrally presenting state shown in FIG. 6(D).

In this way, the filament 22a forming the core 23 and the filament 22c forming the sheath 24 at a certain position are exchanged at a different position.

Likewise, positions are exchanged along the longitudinal direction of the cord, so that all the filaments 22a, 22b, 22c, 22d, 22e, 22f may become the core 23, in a predetermined sequence, by twisting.

It is preferred that the filaments 22 may be exchanged in a specific sequence in order to improve the uniformity, but they may be also exchanged randomly.

The exchange pitch of the filaments 22 is about 1.0 to 10.0 times the twisting pitch P2 in the sheath 24.

Thus, in the band cord 21, the length of all filaments is nearly equal by the exchange of the filaments 22, and the tensile stress acts almost uniformly on the filaments 22, so that the tensile strength is improved in the entire cord.

Besides, by the waving and exchange of filaments 22, the filaments are mutually entangled and firmly, and the resisting force to slipping of the core is noticeably increased if the a tensile stress acts in part of the filaments, it is dispersed in the other filaments, so that the tensile strength of the entire cord is improved.

Therefore, by combining the full band ply 11A1 of the cord 21 wound spirally and substantially parallel to the tire equator C, and two breaker plies 9A, 9B with a cord angle θ1 of 10 to 20 degrees, the truss structure is formed rigidly and in excellent balance, and as compared with the conventional three-layer breaker structure, a superior hoop effect is exhibited, and the tread rigidity is effectively improved.

As a result, a steering stability equally comparable with a heavy duty tire with a conventional four-breaker-ply structure is produce, whereby the tire weight may be notably decreased.

At the same time, the rubber penetration into the band cord 21 is notably improved, not only by the gap G1 formed by the waving of filaments 22, but also by the vacant space F formed at the time of exchanging the position of the filaments 22.

This waving of the filaments increases the elongation at the breaking point of the steel cord 21 (stretchability) up to a range of 4 to 10%. Consequently, the band 11 formed by spirally winding the band cord 21 can be stretched to 2.5 to 4.0% at the time of vulcanization, so that vulcanization at high precision may be realized.

Moreover, the cord is wide in its elastic region and excellent in its tightening effect on the breaker 9, and hence loosening of the breaker 9 during running, and moving and deviation of the breaker 9 during vulcanization can be suppressed. Therefore, high speed durability and uniformity may be improved.

Incidentally, if the elongation at break is less than 4%, such effect cannot be expected. If exceeding 10%, the tire shape is unstable, and steering stability is spoiled.

The lower limit of the elongation at break is preferably not less than 4.5%, more preferably not less than 5.0%. The upper limit is not more than 8%, preferably not more than 7%.

If the waving pitch P1 of the filaments 22 is larger than 25 mm, and the deflection width Q is less than 0.25 mm, the necessary effects for enhancing rubber penetration, enhancing core slip resistance, and suppressing rupture and injury are not sufficiently obtained. On the contrary, if the waving pitch P1 is less than 7 mm and the deflection width Q is more than 1.25 mm, the elongation at break tends to be excessive, and twisted filaments 22 are likely to get loose, and it is had to maintain the cord structure.

The waving pitch P1 is preferred to be 0.4 to 3.0 times the twisting pitch P2 of the sheath 24. If exceeds 3.0 times, the portions inferior in rubber penetration are likely to scatter about in the longitudinal direction, and the uniformity is spoiled. If less than 0.4 times, the elongation at break is excessive, and twisted filaments 22 are likely to get loose.

FIG. 7 shows another example of the breaker 9 and band 11, wherein one breaker ply 9C is added inside of the breaker plies 9A and 9B to form a breaker 9 in a three-ply structure, and this structure is employed in a low aspect ratio tire whose aspect ratio is not more than 70%.

In this ply 9C, the cord is inclined in the same direction as the cord of the adjacent ply 9A, and the cord angle to the tire equator is set at 60 to 70 degrees.

The band 11 is formed of one ply 11A formed of a pair of axially spaced edge band plies 11A2 covering only each of the edge portions of the breaker 9.

It is preferred that the axial outer edge of the edge band ply 11A2 be flush with the outer edge of the adjacent breaker ply 9B, or slightly projecting to the outside, in the tire axial direction.

The overlapping width W3 of the edge band ply 11A2 and the breaker ply 9B is preferred to be 5% or more of the width of the breaker ply, for example, 8 mm or more.

By this edge band ply 11A2, loosening, moving and deviation of the breaker 9 may be suppressed, and uneven lifting due to inflation with internal pressure in the shoulder, particularly notable in a tire with an aspect ratio of 70% or less, is prevented, and an appropriate tread profile intended at the time of designing may be maintained. As a result, ground contact is improved, uneven wear is suppressed, and the steering stability is improved.

Figure 8:
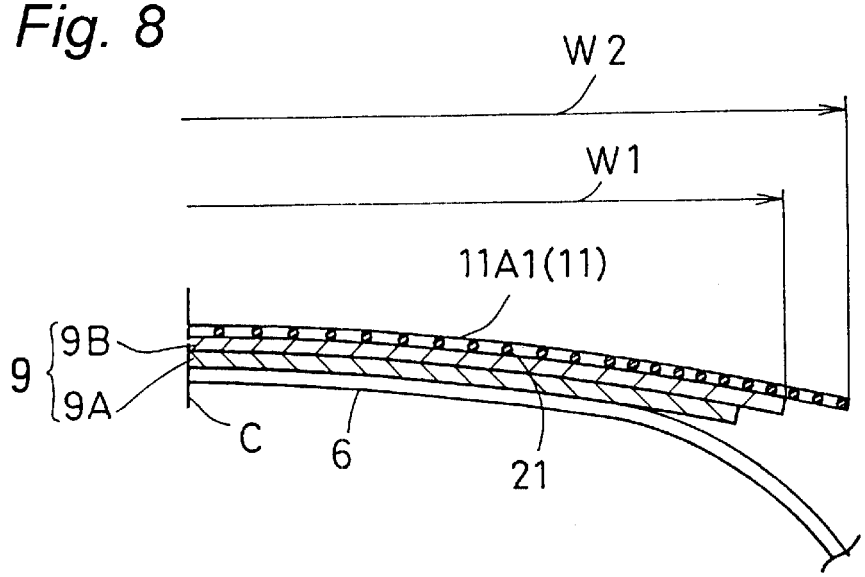

FIG. 8 shows a modified example of the full band ply 11A1 in FIG. 1, wherein the width W2 is more than the width W1 of the breaker ply, and the spiral pitch of the cord in the tread shoulder is denser than the spiral pitch in the tread central part, so that the function as an edge band is exhibited.

TEST EXAMPLES

Tire Performance: Test 1

Test tires in the size of 11R22.5 14P (example tires 1 to 6, reference tires 1 to 4) were fabricated, and the tire strength, high speed durability, tire weight, and ride comfort were tested.

The tire specifications and test results are shown in Table 1.

A) Tire Strength

The tire strength test was the plunger breakdown test conforming to par. 4.2.1 of JIS D 4230, in which the breakdown energy at standard internal pressure was measured, and the results were expressed and compared in the index, supposing the performance of the reference tire 3, a conventional tire, to be 100. The greater value means superiority.

B) High Speed Durability

Using a drum tester, the running speed was accelerated at a rate of 10 km/h in every 120 minutes, and the high speed durability of test tire was evaluated by the speed and total running duration at the time of breakdown of the tire. Table 1 shows the speed-time relation. Measuring conditions: standard internal pressure (7.0 kcs), standard rim (22.5× 7.50V ).

C) Tire Weight

The weight of one tire was measured and shown in Table 1, being expressed in the index on the basis of reference tire 3 as 100. The smaller index is the better.

D) Ride Comfort

A ten-ton truck of 2-DD type having all wheels provided with test tires was run on a paved road, and the ride comfort was evaluated by the feeling of the driver in five ranks. The larger value is the better. (standard internal pressure 7.0 kcs, standard rim 22.5×7.05V)

Test tires in the size of 11/70R22.5 14P (example tire 7, reference tire 5) were landed on the ground in the conditions of standard internal pressure (8.0 kcs), standard rim (22.5× 7.05V), and standard load (2725 kg), and the foot print was measured.

The tire specification and results of measurement are shown in Table 2.

In this reference tire 5, lifting was caused in the shoulder portion, and the ground contact pressure in this area was unevenly raised.

By contrast, in the example tire 7, by tightening of the edge band ply 11, it is known that lifting of the shoulder portion is prevented.

TABLE 2

|  | Ex.7 | Ref.5 |
|---|---|---|
| BREAKER |  |  |
| Number of plies | 3 | 4 |
| Cord structure | 3/0.20 + 6/0.35 | 3/0.20 + 6/0.35 |
| Elongation at break (%) | 2 | 2 |
| Cord angle (degree) (inside to outside) | 67/18/18 | 67/18/18/18 |
| Ply width (mm) (inside to outside) | 185/210/190 | 185/210/190/105 |
| BAND |  |  |
| Ply type | edge band | — |
| Cord structure | 1 + 5/0.32 | — |
| Filament exchange | occur | — |
| Filament waving | occur | — |
| Elongation at break (%) | 5.0 | — |
| Cord angle (degree) | 0 | — |
| Ply width (mm) | 15(/piece) | — |
| Tire weight (index) | 99 | 100 |
| Footprint | FIG.9 A | FIG.9 B |

Figure 10:
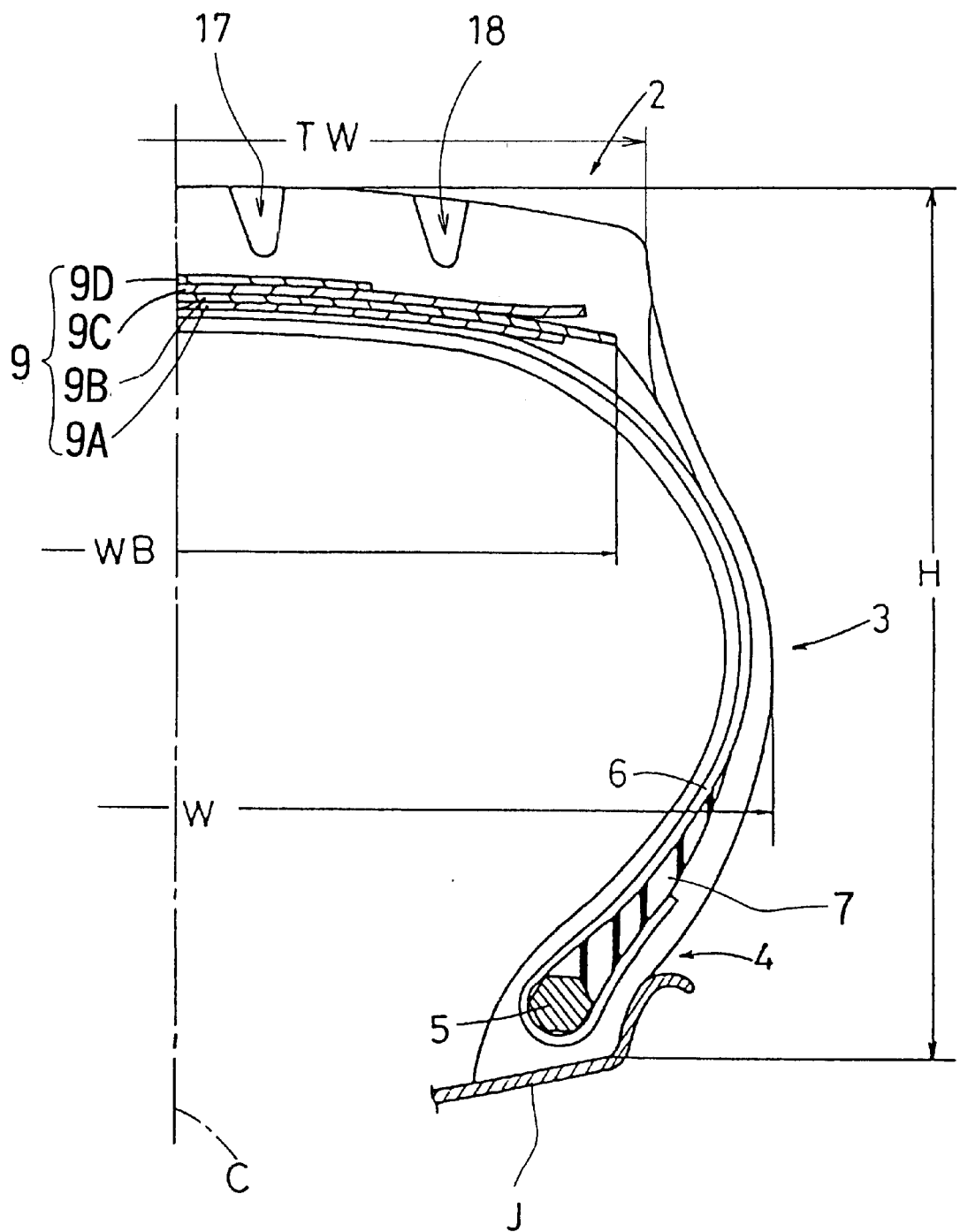
FIG. 10 is a cross sectional view of another embodiment of the present invention.

FIG. 10 shows a second embodiment of the present invention.

In this embodiment, the steel cords of the novel structure are used in some of a plurality of breaker plies, and the cord angle in each ply is specifically defined, so that the spiral band 11 in the first embodiment is omitted.

As explained in the first embodiment, in the conventional steel cord, since the elongation at break is as small as 1 to 3%, and to form a breaker of three or four plies with such cords, it is necessary to set the cord angle relatively large, about 10 to 35 degrees to the tire circumferential direction in order to obtain the necessary stretch at the time of vulcanization.

Such a breaker is weak in its restricting force in the edge as compared with the center, and when a band for tightening the breaker is omitted, breaker lifting is significantly large in the breaker edge, although small in the center. Hence, separation of tread rubber and breaker is induced. Moreover, due to this the foot print of the tire tread becomes as shown in FIG. 9(B), and the tread center being lower in the ground

TABLE 1

|  | Ex.1 | Ref.1 | Ref.2 | Ex.2 | Ex.3 | Ex.4 | Ref.3 | Ref.4 | Ex.5 | Ex.6 |
|---|---|---|---|---|---|---|---|---|---|---|
| BREAKER |  |  |  |  |  |  |  |  |  |  |
| Number of plies | 2 | 2 | 2 | 2 | 2 | 2 | 4 | 3 | 2 | 2 |
| Cord structure | 3/0.20 + 6/0.35 | 3/0.20 + 6/0.35 | 3/0.20 + 6/0.35 | 3/0.20 + 6/0.35 | 3/0.20 + 6/0.35 | 3/0.20 + 6/0.35 | 3/0.20 + 6/0.35 | 3/0.20 + 6/0.35 | 3/0.20 + 6/0.35 | 3/0.20 + 6/0.35 |
| Elongation at break (%) | 2 | 2 | 2 | 2 | 2 | 2 | 2 | 2 | 2 | 2 |
| Cord angle (degree) (inside to outside) | 16/16 | 16/16 | 16/16 | 10/10 | 20/20 | 16/16 | 67/16 /16/16 | 67/16/16 | 16/16 | 16/16 |
| Ply width (mm) (inside to outside) | 158/182 | 158/182 | 158/182 | 158/182 | 158/182 | 158/182 | 158/182 /162/75 | 158 /182/162 | 158/176 | 158/176 |
| BAND |  |  |  |  |  |  |  |  |  |  |
| Ply type | full band | full band | full band | full band | full band | full band | — | — | full band | edge band |
| Cord structure | 1 + 5/0.32 | 3 × 2/0.32 | 1 × 1/1.65 | 1 + 5/0.32 | 1 + 5/0.32 | 1 + 6/0.30 | — | — | 1 + 5/0.32 | 1 + 5/0.32 |
| Filament exchange | occur | non | non | occur | occur | occur | — | — | occur | occur |
| Filament waving | occur | non | non | occur | occur | occur | — | — | occur | occur |
| Elongation at break (%) | 5.0 | 5.0 | 5.0 | 5.0 | 5.0 | 5.0 | — | — | 5.0 | 5.0 |
| Cord angle (degree) | 0 | 0 | 0 | 0 | 0 | 0 | — | — | 0 | 0 |
| Ply width (mm) | 162 | 162 | 162 | 162 | 162 | 162 | — | — | 186 | 40(/piece) |
| Tire strength (index) | 82 | 74 | 92 | 79 | 81 | 98 | 100 | 88 | 82 | 74 |
| High speed durability Speed(km/h)-Time | 130-1:15 | 130-1:09 | 130-0:32 | 130-0:44 | 130-0:09 | 130-0:40 | 130-0:02 | 130-0:12 | 130-1:58 | 140-0:35 |
| Tire weight (index) | 96 | 97 | 96 | 96 | 96 | 96 | 100 | 98 | 96 | 95 |
| Ride comfort (index) | 3.0− | 3.0− | 2.5− | 3.0− | 3.0 | — | — | 3.0 | — | — | contact pressure slips on the road surface, especially on the drive wheels, and the tread center wears early, which is known as center wear. In the non-drive wheels, the tread shoulder wear is likely to occur. Such uneven wear tends to increase as the tire aspect ratio becomes smaller.

This problem can be solved by using a band for tightening the breaker as in the first embodiment, but the inventors investigated this problem from a completely different point of view, and discovered that the tire foot print can be formed with an ideal shape, excellent that the ground contact pressure may be achieved, and uneven wear can be suppressed, by improving the breaker structure so that the same lifting as in the breaker edge portion may be also obtained in the center.

In this embodiment, since the band winding process is not needed, the productivity is notably improved. It also contributes to reduction in the tire weight. Thus, in this embodiment, it is intended to omit the band, without lowering other running performances, by using steel cords of novel structure in the breaker.

The pneumatic tire for a heavyload in FIG. 10 is the same as the tire in FIG. 1, and comprises a tread portion 2, a sidewall portion 3, a bed 4, a bead core 5, a carcass 6, and a bead apex 7.

The aspect ratio (H/W) of this tire is in the range of 50% to 70%, and about 70% in this example.

The tread portion 2 is provided with grooves 17, 18 extending in the tire circumferential direction, and grooves of various shapes may be used, such as straight, zigzag form and the like. Needless to say, circumferential grooves are provided also in the first embodiment.

The breaker 9 in this embodiment has a four-layer structure consisting of first, second, third, and fourth breaker plies 9A, 9B, 9C, 9D disposed in this order from the inside to outside of the tire radial direction. Each ply is formed of steel cords laid parallel to each other.

Concerning the width of the breaker plies in the tire axial direction, the width WB of the second ply 9B is the greatest, and this width WB is about 80% to 95% of the tread width TW.

Figure 11:
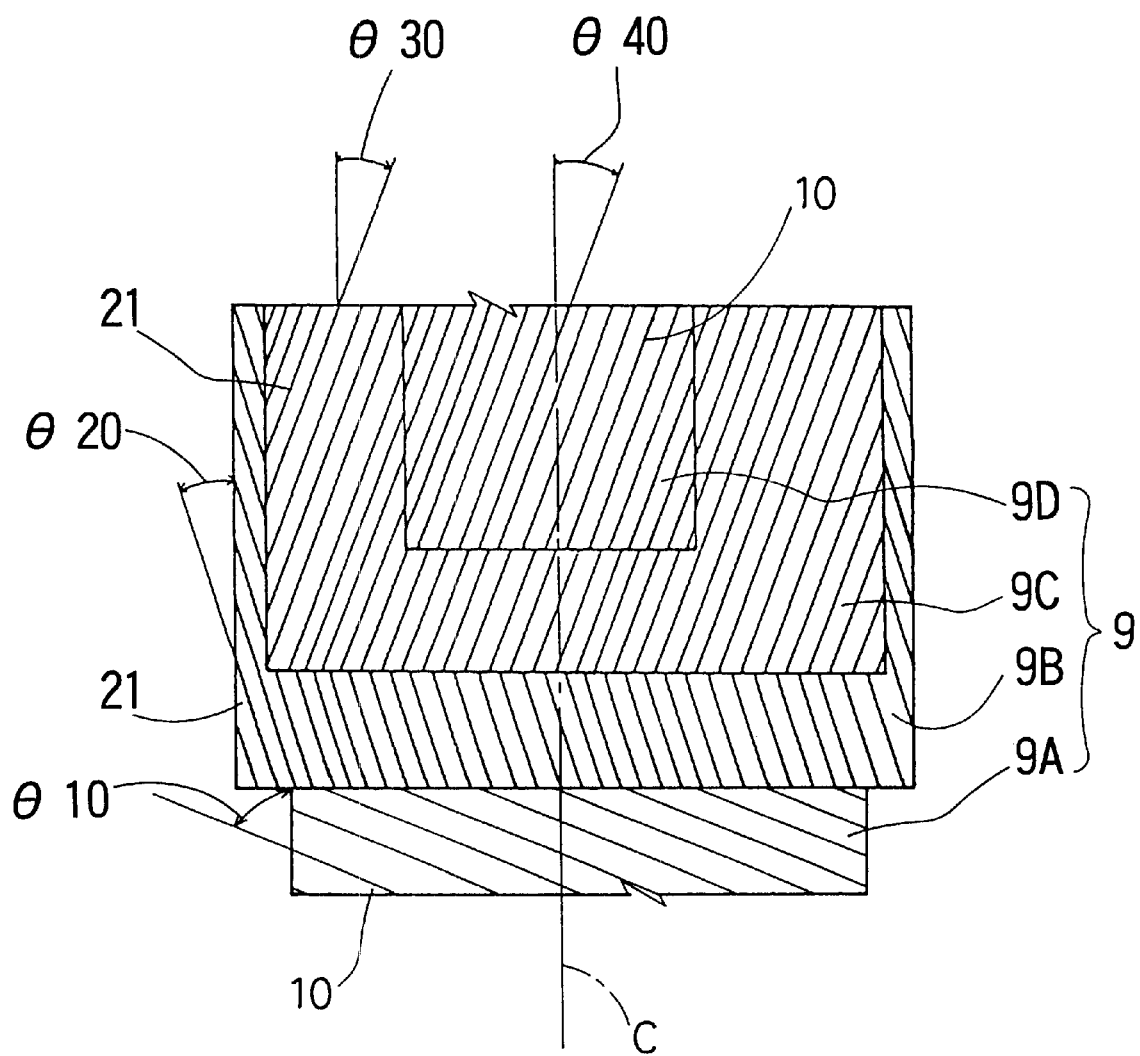
FIG. 11 is a schematic plan view showing the breaker belt therefor.

Sequentially from the greatest width in the tire axial direction, in this example, the second ply 9B, third ply 9C, first ply 9A and fourth ply 9D are arranged, but this sequence is not limited. 9B>9C>9A>9D FIG. 11 shows the breaker ply arrangement. The first ply 9A is formed of low elongation cords 20 with elongation at break of 1 to 3%, laid at a relatively large angle $\theta 11$ of 40 to 70 degrees to the tire equator C. In this embodiment, as the low elongation cords 20, a steel cord with a 3/0.20+6/0.35 structure in which the number of twists is set so that the elongation at break is 2% is used, and the angle is $\theta 11=67$ degrees. The cord count may be determined freely depending on the required performance.

The second and third breaker plies 9B, 9C are composed of high elongation steel cords 21 with elongation at break of 4 to 10%.

The cord angles $\theta 12$, $\theta 13$ of the plies 9B, 9C are in the range of from 10 to 20 degrees to the tire equator C, and although they are mutually equal values, the inclination directions are opposite, and the cords 21 of second and third plies intersect with each other.

In this example, the elongation at break of the high elongation cord 21 is 6%, and the cord angle is $\theta 12=\theta 13=18$ degrees.

The fourth ply 9D is formed of low elongation cords 20 with elongation at break of 1 to 3%, laid at an angle of $\theta 14$ to 10 to 20 degrees to the tire equator C. In this embodiment, it is made of the same cord as in the first breaker ply 9A.

As shown in FIG. 11, the breaker cords of the first and second breaker plies 9A, 9B are arranged in the same direction to the tire equator C, or in the left upward direction in this example.

The breaker cords of the third and fourth breaker plies 9C, 9D are arranged in a reverse direction to the breaker cords of the first and second breaker plies with respect to the tire equator, or in the right upward direction in this example.

On the whole, the number of plies is equal between the plies of which cord laying direction is right, and the plies of which cord laying direction is left.

Although the fourth breaker cord 9D can be omitted, in the example in FIG. 11, by forming it, the elongation of the breaker cords is balanced at right and left sides.

Figure 14:
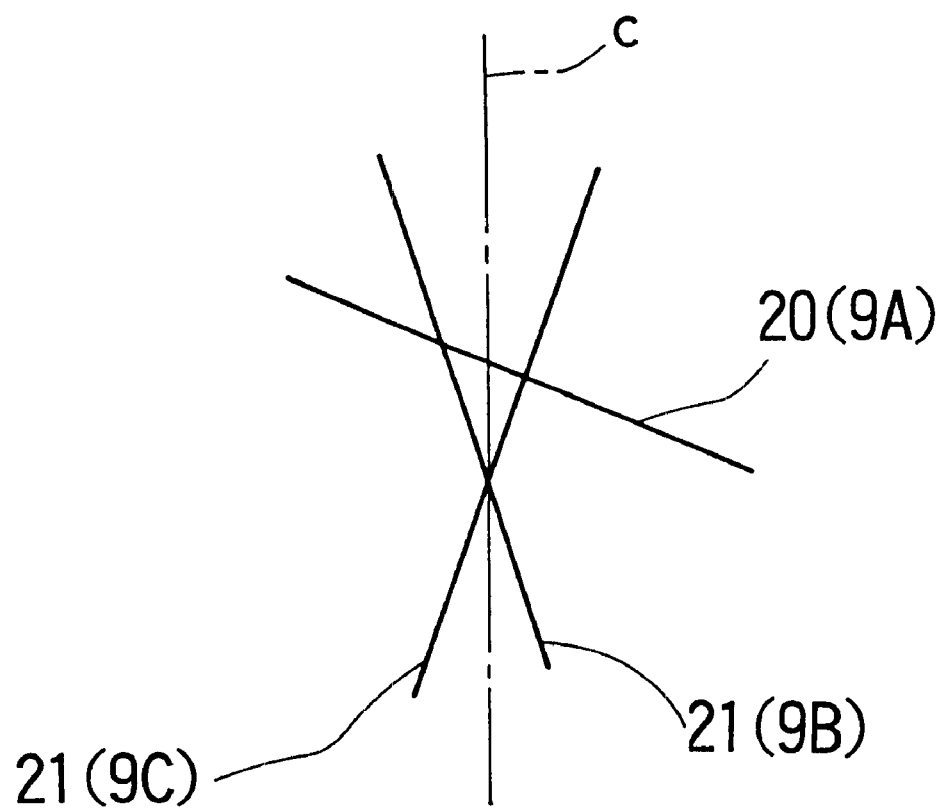
FIG. 14 shows have the breaker belt cords cross each other to form a triangular structure.

The cords 20, 21, 21 of the first, second and third breaker plies 9A, 9B, 9C are formed in a triangular structure as shown in FIG. 14.

In such breaker structure, when centrifugal force acts by high speed rotation, lifting occurs in the edge of the breaker, and elongation of the cords in the center, so that the entire breaker may be almost uniformly lifted in the radial direction.

Figure 9A:
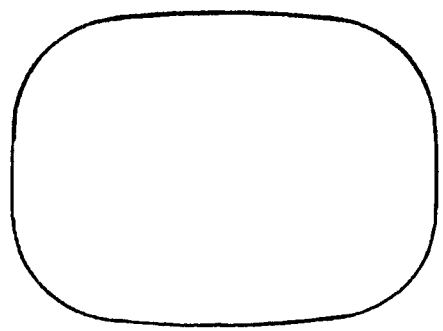
FIGS. 9A and 9B are diagrams showing footprint shape of the test tires in Table 2.
Figure 9B:
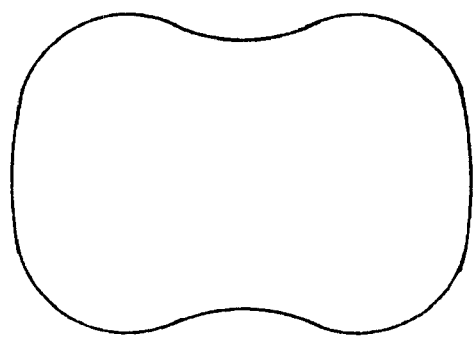

Therefore, the ground contact pressure of the tread surface is nearly uniform, and the ground contact shape of the tread is an ideal shape as shown in FIG. 9(A). As a result, uneven wear can be prevented.

Moreover, by the breaker structure, the envelope characteristic of the tread crown may be improved, and the riding comfort is improved.

Incidentally, if the high elongation cord is employed in all of the first, second, third and fourth plies 9A, 9B, 9C, 9D, heat generation of rubber increases, and the durability of the tire is extremely reduced, and hence it is not suited to practical use.

Or if the first and second breaker plies 9A, 9B are made of high elongation cord and the third breaker ply 9C is made of low elongation cord, the elongation of the breaker 9 is not uniform due to difference in the laying angles $\theta 11$, $\theta 12$ of the first and second breaker plies, and the plies are uneven, and it is hard to obtain a uniform tread ground contact pressure.

If high elongation cord is used in the first and third breaker plies 9A, 9C, the same problem as mentioned above occurs, and it is not recommended.

When low elongation cord is used in all of the first, second, and third breaker plies 9A, 9B, 9C the same as in the conventional breaker structure, the ground contact shape is uneven, and the uneven wear suppressing effect is inferior.

By contrast, in this embodiment, the high elongation cord 21 is used in the second and third breaker plies 9B, 9C which are in symmetrical structure, at a relatively small angle to the circumferential direction of the tire, and the low elongation cord 20 is used in the first breaker ply 9A of a relatively large angle $\theta 11$ in the circumferential direction of the tire, so that all the problems above can be solved.

If, meanwhile, the elongation at break of the high elongation cord 21 is over 10%, the hoop effect of the breaker itself cannot be exhibited, and the tire strength is lowered, and the shape cannot be retained.

Figure 12:
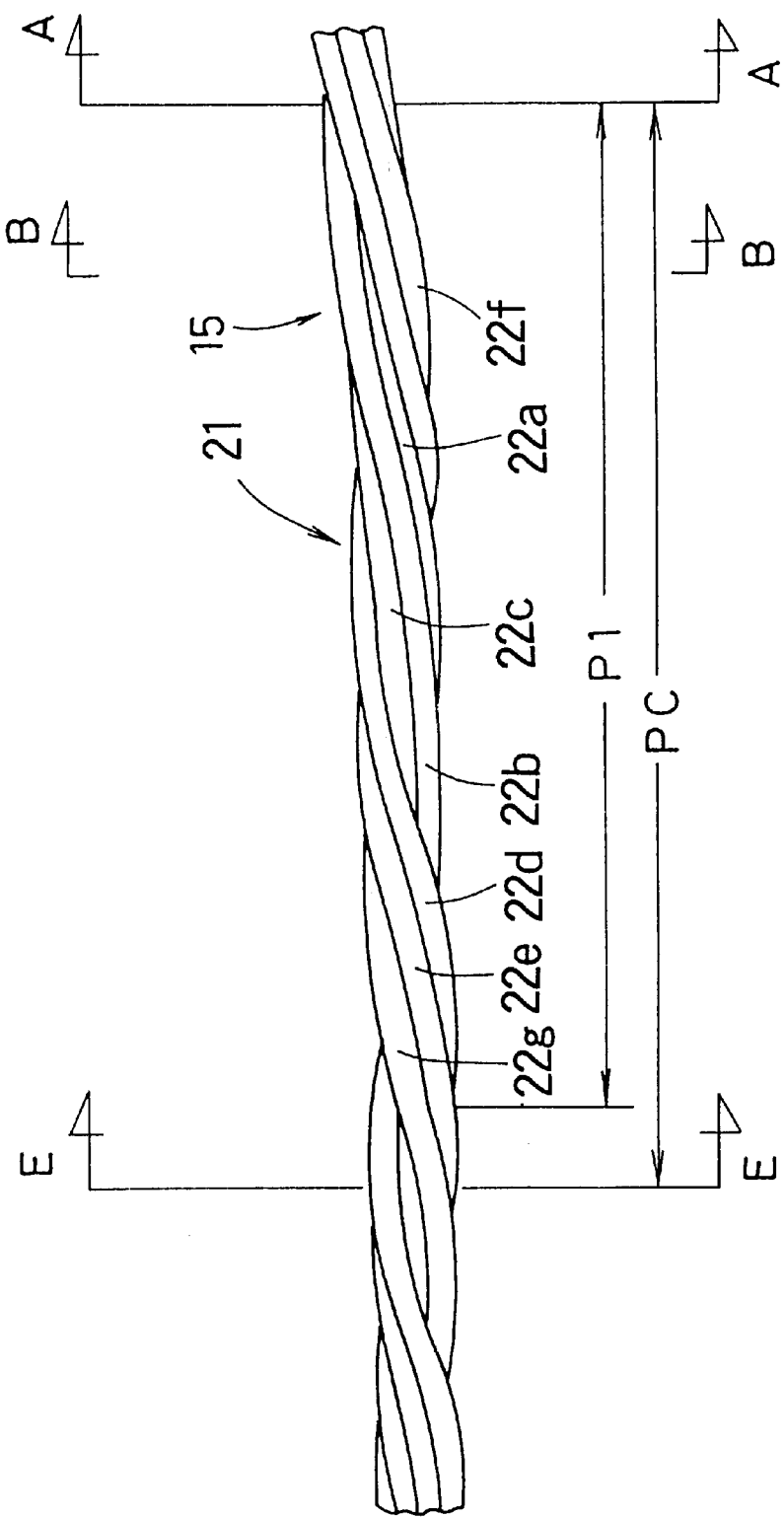
FIG. 12 is a side view of a high elongation cord used in the breaker belt.
Figure 13:
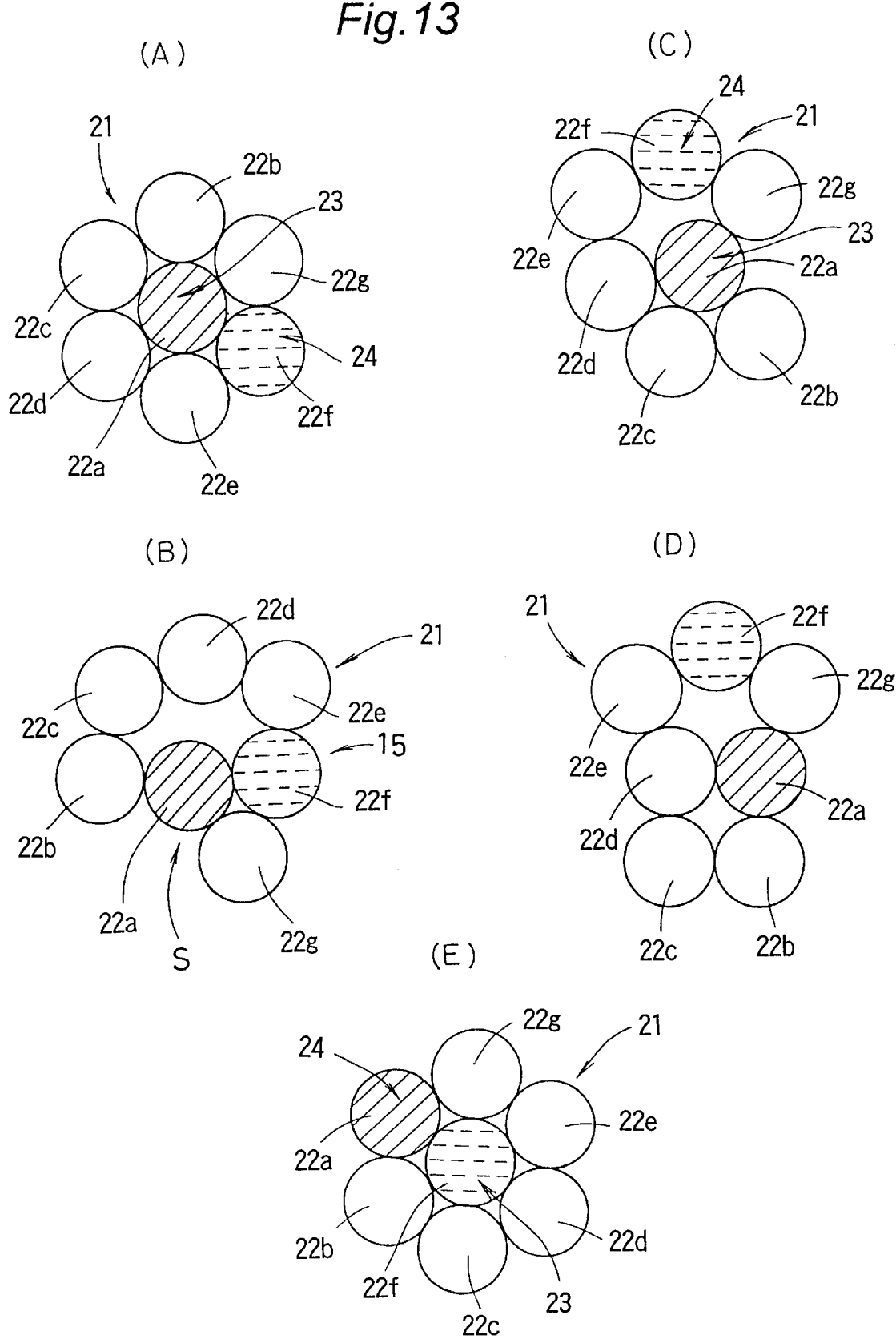

In the high elongation cords 21 used herein, as shown in FIG. 12 and FIG. 13, waving steel filaments of same diameter are twisted to be exchanged between the core and sheath in a predetermined order as in the former example of FIG. 3 to FIG. 6 in the first embodiment. Herein, too, the number of steel filaments serving as the core 23 is only one, and the sheath 24 formed by the remaining steel filaments is of a single layer.

The total number of steel filaments is 3 to 7, or 7 in this example.

Twisting of the filaments 22 is same as in the preceding example, and is approximately as follows.

As shown in FIG. 13(A) which shows section A—A of FIG. 12, one filament 22a forms the core 23, and the remaining six filaments 22b, 22c, 22d, 22e, 22f, 22g are adjacently laid around its circumference to form the sheath 24.

In FIG. 13(B) showing section B—B of FIG. 12, one of six filaments servicing as the sheath, that is, filament 22g moves outward in the radial direction of the cord, and a space S is formed between the filament 22b and filament 22g.

Through the filament layout shown in FIG. 13(C), (D), in FIG. 13(E) showing section E—E of FIG. 12, the filament 22f so far forming the sheath 24 is replaced by the core 23, and the filament 22a so far forming the core 23 is forming part of the sheath 24.

Thus, from FIG. 13(A) to FIG. 13(E), an exchanging portion 15 is formed, in which the filament 22a so far forming the core 23 is exchanged with the filament 22f so far forming part of the sheath 24.

Thus, concerning all filaments 22a, 22b, 22c, 22d, 22e, 22f, 22g, an exchanging portion 15 for exchanging from the sheath 24 to the core 23 in the predetermined sequence is formed, and therefore the exchanging portion 15 is repeated at a certain pitch PC in the length direction of the cord. Exchange of the filaments 22 may be either in specific sequence or in random sequence.

The exchange pitch PC is in the range of 1.0 to 10.0 times the twisting pitch of the sheath 24.

In FIG. 13(A) to (E), schematically, the filaments 22 are shown to be adjacent to each other, but actually since the filaments 22 are waved previously, there are multiple spaced portions.

Tire Performance: Test 2

Test tires in the size of 11/70R22.5 (example tires 11 to 14, reference tires 11 to 14) were fabricated in the specifications as shown in FIG. 10 and Table 3, and the following tests were conducted.

A) Tire strength

The plunger breakdown test conforming to JIS D 4230 was conducted same as in the first embodiment. The breakdown energy is shown in Table 3, being expressed in the index, supposing the performance of the reference tire 11 to be 100. The greater value means superiority. Rim: standard rim (22.5×7.50V), tire internal pressure: 8.0 kcs B) High Speed Durability Using a drum tester, the running speed was accelerated at if a rate of 10 km/h in every 120 minutes, and the high speed durability of test tire was evaluated by the speed and total running duration at the time of breakdown of the tire. Table 3 shows the speed-time relation. Tire load: 140% of the maximum load.

C) Tire Weight

The weight of one tire was measured and shown in Table 3, being expressed in the index on the basis of reference tire 11 as 100. The smaller index is the better.

D) Ride comfort

A 2-D type test car having all wheels provided with test tires was run on a test course, and the ride comfort was evaluated by the sensory test by the driver. The results are expressed in the index, with reference tire as 100. The larger value is the better.

E) Uneven Wear on Front and Rear Wheels

The 2-D type test car having all wheels provided with test tires was driven for 20,000 km and 50,000 km, and uneven wear was measured, and shown in the upper and lower liens of the column of Table 3. As the uneven wear, in the front wheel tires, the shoulder wear (mm) was measured, and in the rear wheel tires, the center wear (mm) was calculated by subtracting the groove depth in the crown from the groove depth of the shoulder groove. Front wheel load: 2725 kgf, rear wheel load: 2500 kgf.

Test results are shown in Table 3, and the types of cords are classified in Table 4.

F) Wear Index

Test tires were mounted on rear wheel of a 2-D type bus, and the running distance until the groove depth of the tread crown, which is initially 16 mm, became 3.2 mm was measured, and the results are shown in the index based on that the value of reference tire 11 as 100. The greater index is superior. Tire load: 2500 kgf From the test results, it was confirmed that, in all example tires 11 to 14, uneven wear was suppressed, and the breaker rigidity was optimized between the breaker edge and center, so that the envelope characteristic was improved, and thereby the ride comfort was maintained the same or even improved as compared with the prior art.

In particular, in example tires 11 to 13 employing cord B, the tire strength was also improved owing the cord characteristic.

At the same time, these results were confirmed to be exhibited also in tires of different sizes.

In reference tire 14 not using low elongation cord, although uneven wear was suppressed, the tire strength was extremely lowered.

In reference tires 11 to 13, uneven wear could not be suppressed sufficiently.

TABLE 3

|  | Ex.11 | Ex.12 | Ex.13 | Ex.14 | Ref.11 | Ref.12 | Ref.13 | Ref.14 |
| --- | --- | --- | --- | --- | --- | --- | --- | --- |
| BREAKER |  |  |  |  |  |  |  |  |
| 1st ply |  |  |  |  |  |  |  |  |
| Cord type* | A | A | A | A | A | A | A | A |
| Count (ends/5 cm) | 20 | 20 | 20 | 20 | 20 | 20 | 20 | 20 |
| Elongation at break (%) | 2 | 2 | 2 | 2 | 2 | 2 | 2 | 6 |

TABLE 3-continued

|  | Ex.11 | Ex.12 | Ex.13 | Ex.14 | Ref.11 | Ref.12 | Ref.13 | Ref.14 |
|---|---|---|---|---|---|---|---|---|
| 2nd ply |  |  |  |  |  |  |  |  |
| Cord type* | B | B | B | C | C | C | B | B |
| Count (ends/5 cm) | 26 | 26 | 26 | 26 | 26 | 26 | 26 | 26 |
| Elongation at break (%) | 6 | 4 | 10 | 6 | 2 | 3 | 12 | 6 |
| 3rd ply |  |  |  |  |  |  |  |  |
| Cord type* | B | B | B | C | C | C | B | B |
| Count (ends/5 cm) | 26 | 26 | 26 | 26 | 26 | 26 | 26 | 26 |
| Elongation at break (%) | 6 | 4 | 10 | 6 | 2 | 3 | 12 | 6 |
| 4th ply |  |  |  |  |  |  |  |  |
| Cord type* | A | A | A | A | A | A | A | A |
| Count (ends/5 cm) | 20 | 20 | 20 | 20 | 20 | 20 | 20 | 20 |
| Elongation at break (%) | 2 | 2 | 2 | 2 | 2 | 2 | 2 | 6 |
| Tire strength (index) | 102 | 100 | 101 | 97 | 100 | 99 | 101 | 87 |
| High speed durability Speed(km/h)-Time | 120-1:29 | 120-1:40 | 120-0:39 | 120-0:42 | 120-1:41 | 120-1:44 | 120-0:59 | 100-1:48 |
| Tire weight (index) | 100 | 100 | 100 | 101 | 100 | 100 | 101 | 103 |
| Wear index | 125 | 108 | 117 | 123 | 100 | 102 | 94 | 99 |
| Uneven wear (mm) |  |  |  |  |  |  |  |  |
| Front tire |  |  |  |  |  |  |  |  |
| 20,000 km | 1.5 | 2.5 | 1.0 | 1.0 | 4.0 | 4.0 | 2.5 | 2.0 |
| 50,000 km | 3.0 | 4.5 | 2.5 | 3.0 | 7.5 | 6.5 | 3.0 | 4.0 |
| Rear tire |  |  |  |  |  |  |  |  |
| 20,000 km | 0.2 | 0.7 | 1.1 | 0.3 | 1.2 | 0.9 | 1.7 | 0.4 |
| 50,000 km | 0.7 | 1.1 | 1.3 | 0.5 | 2.5 | 1.9 | 2.2 | 1.2 |
| Ride comfort(index) | 120 | 105 | 100 | 120 | 100 | 100 | 95 | 85 |

| *Cord type | A | B | C |
|---|---|---|---|
| Structure | 3/.20 + 6/.35 | 1 + 5/.32 | 1 + 5/.32 |
| Filament waving | non | occur | non |
| Filament exchange | non | occur | non |

What is claimed is:

1. A tire comprising a reinforcing layer made of at least one high-elongation steel cord, wherein each said at least one high-elongation steel cord is formed by twisting at least three steel filaments together to form a core and a sheath surrounding the core, said at least three filaments change place repeatedly along the longitudinal direction of the cord such that one of the filaments forms the core in a portion, but in a different portion of the cord, said one of the filaments forms part of the sheath, thereby defining a plurality of first parts with the core and a plurality of second parts without the core which are disposed alternately in the longitudinal direction of the cord, wherein each of the first parts is defined by the core consisting of one of the filaments and the sheath consisting of all the remaining filaments surrounding the core, and each of the second parts is defined by the sheath consisting of all the filaments surrounding a central space.

* * * * *